United States Patent [19]
Shikano

[11] Patent Number: 5,602,809
[45] Date of Patent: Feb. 11, 1997

[54] OPTICAL SYSTEM IN A TRACK-FOLLOWING SERVO SYSTEM HAVING AN ELLIPTICAL BEAM SPOT

[75] Inventor: Yoshinori Shikano, Saitama-ken, Japan

[73] Assignee: Pioneer Electronic Corporation, Tokyo, Japan

[21] Appl. No.: 466,724

[22] Filed: Jun. 6, 1995

Related U.S. Application Data

[63] Continuation of Ser. No. 238,336, May 4, 1994, abandoned, which is a continuation of Ser. No. 923,424, Aug. 3, 1992, abandoned.

[30] Foreign Application Priority Data

Feb. 28, 1992 [JP] Japan ................... 4-078486

[51] Int. Cl.[6] ............................................. G11B 7/09
[52] U.S. Cl. ................... 369/44.23; 369/44.32
[58] Field of Search ............... 369/44.23, 44.41, 369/44.42, 112, 44.32, 54

[56] References Cited

U.S. PATENT DOCUMENTS 5,036,185  7/1991  Ando ........................... 369/44.23 X
5,150,342  9/1992  Nagahara et al. ............. 369/44.41 X
5,173,890  12/1992  Miyake et al. ................ 369/44.23

*Primary Examiner*—W. R. Young
*Attorney, Agent, or Firm*—Nikaido Marmelstein Murray & Oram LLP

[57] ABSTRACT

An optical system has a prism for deforming a sectional shape of a laser beam reflected on an optical disc into an ellipse, and a photodetector comprising a pair of detector elements disposed side by side in a direction perpendicular to the tangential direction of the disc. The elliptic beam is irradiated on the photodetector to form an elliptic spot thereon, so that the major axis of the elliptic beam spot is perpendicular to the tangential direction, and the area of the elliptic beam spot is larger than that of the photodetector.

3 Claims, 4 Drawing Sheets

REFLECTED BEAM

OPTICAL SYSTEM IN A TRACK-FOLLOWING SERVO SYSTEM HAVING AN ELLIPTICAL BEAM SPOT

This application is a continuation of application Ser. No. 08/238,336 filed May 1, 1994, which is a continuation of application Ser. No. 07/923,424 filed on Aug. 3, 1992, both now abandoned.

FIELD OF THE INVENTION

The present invention relates to an optical system for a track-following servo system having an optical pickup for an optical disc such as a CD, and more particularly to a system for deriving a tracking error signal in accordance with a push-pull method.

BACKGROUND OF THE INVENTION

The push-pull method is one of the methods for deriving a tracking error signal. Referring to FIGS. 5a to 5c, the push-pull method uses change in distribution of energy in a beam spot which is caused by light diffracted and reflected by a pit P on a disc D when a laser beams is deflected from a track of the disc. When the laser beam is properly centralized on the track, the light is equally diffracted to the right and the left as shown in FIG. 5b. Thus energy is equally distributed. On the other hand, if the tracking is off-center as shown in FIGS. 5a and 5c, the reflected beams are asystemmetrically diffracted. By obtaining the difference between the distributions of energy, it can be determined the direction in which the beam is deflected from the track.

Referring to FIG. 6, a conventional track-following servo system using the push-pull method has a photodetector 4 for detecting the spot of the reflected beams. The photodetector 4 has two detecting areas 2 and 3 which are defined by a central boundary line 1 in the tangential direction of the disc. The reflected beam forms a shadow by a hatched area in FIG. 6 on each of the detecting areas 2 and 3. The areas of the shadows are applied to a differential amplifier 5 which applies a positive or negative tracking error signal to a track-following servo circuit 6. The circuit 6 operates an actuator 7 for positioning the optical pickup to render the difference of areas between the shadows on the detecting areas 2 and 3 zero.

If the track on the disc is properly followed, diffracting the beam as shown in FIG. 5b, the shadows formed on the detecting areas 2 and 3 have the same area so that the difference therebetween is zero. Hence the actuator 7 is not operated. If the beam is deflected to the left of the pit, thereby giving a diffraction shown in FIG. 5a, the shadow on the detecting area 2 is smaller than the shadow on the detecting area 3. To the contrary, if the beam is deflected to the right, so that the beam diffracts as shown in FIG. 5c, the shadow on the area 3 becomes smaller than the shadow on the area 2. Thus a difference is obtained by the differential amplifier 5, thereby applying a tracking error signal to the track-following servo circuit 6. As a result, the actuator 7 is operated.

In the push-pull method, when the axis of the laser beam is not vertical to the recording surface of the disc, or the objective is moved, or the axis of the laser beam is deflected, the spot of the reflected beam is deflected in the direction perpendicular to the center line 1. Consequently, the distribution of the energy of the spot received by the detecting areas 2 and 3 fluctuates, thereby causing the tracking error signal to have a DC offset. The track-following servo circuit 6 is operated in accordance with the erroneously offset tracking error signal so that the beam is further deflected from the track.

In order to reduce the DC offset, a part of the photodetector 4 is masked to render the size of the detecting areas 2 and 3 smaller than the spot as shown in FIG. 6. Elliptic masks may be further formed on the photodetector 4 as shown in FIG. 7.

However, since each mask must be designed to conform with the reflected beam, which is very small, it is difficult to provide an appropriate mask. Furthermore, the spot size of the light beam must be adjusted in accordance with the mask, which is also quite difficult.

SUMMARY OF THE INVENTION

An object of the present invention is to provide a track-following servo system of an optical pickup wherein a sectional shape of the light beam reflected from the disc is deformed to an ellipse so as to reduce a DC offset in a tracking error signal, thereby providing a reliable tracking error signal.

According to the present invention, there is provided a track-following servo system of an optical pickup adapted to be operated in accordance with a tracking error signal obtained by a push-pull method, wherein the track-following servo system has a deforming member for deforming the sectional shape of a beam reflected on an optical disc into an ellipse, a photodetector comprising a pair of detector elements disposed side by side in a direction perpendicular to the tangential direction of the disc. The elliptic beam is irradiated on the disc to form an elliptic spot thereon, so that the major axis of the elliptic beam spot may be perpendicular to the tangential direction, and the area of the elliptic beam spot is larger than that of the photodetector.

The light beam reflected from the disc is shaped into an ellipse by the deforming member. The ellipse has the major axis extending in the tracking direction and the minor axis in the tangential direction of the disc. Although the beam spot may sway due to the tilt of the axis of a laser beam focused on the disc and to the shift of an objective, the size of shadows of the beam spot formed on the photodetector hardly changes, so that the tracking error signal is not affected.

The other objects and features of this invention will become understood from the following description with reference to the accompanying drawings.

DETAILED DESCRIPTION OF THE PREFERRED EMBODIMENTS

Figure 1:
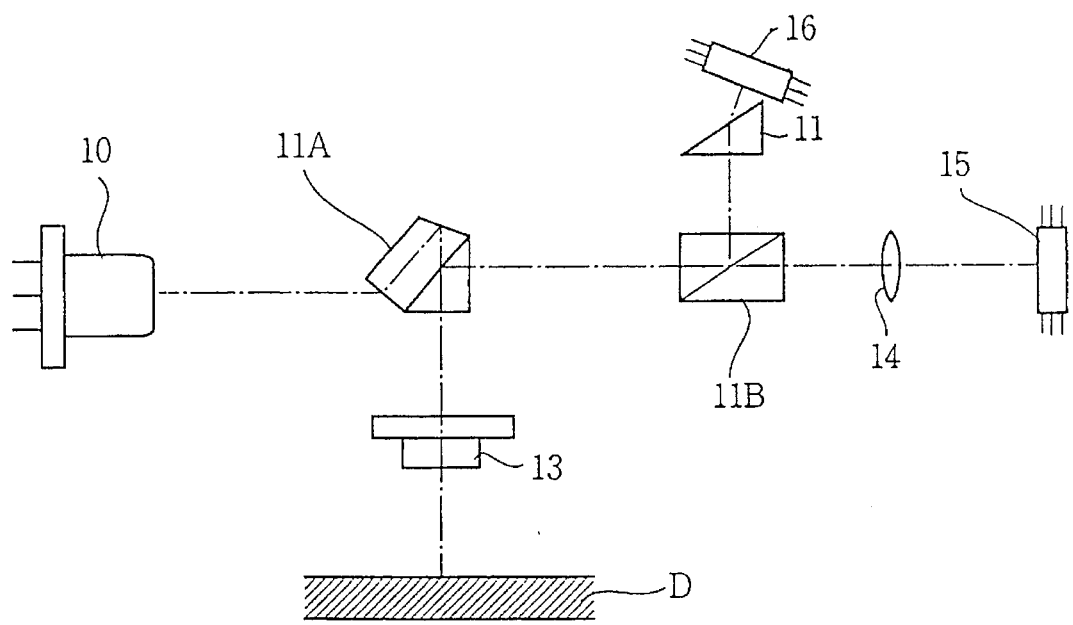
FIG. 1 is a schematic diagram of an optical pickup for producing a tracking error signal in accordance with the present invention.

Referring to FIG. 1, an optical pickup to which the present invention is applied has a semiconductor laser device 10 which emits a laser beam which is focused on an optical disc D through a beam splitter 11A and an objective 13. The beam reflected on the recording surface of the disc D is transmitted to a photodetector 15 of a focusing servo system through the objective 13, beam splitters 11A and 11B, and a converging lens 14 so as to irradiate a detecting area of the photodetector 15. The reflected beam is further transmitted to a photodetector 16 of a track-following servo system through the beam splitter 11B, and a prism 11.

Figure 2:
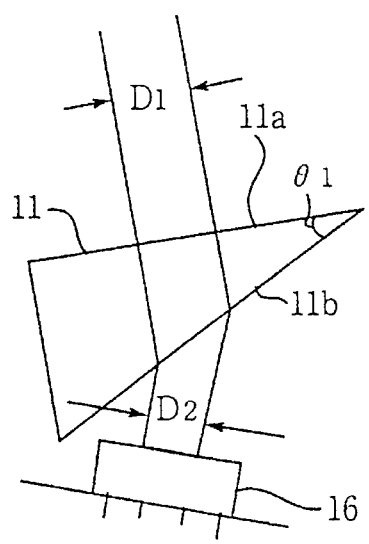
FIG. 2 is a diagram for explaining the operation of a prism provided in the pickup of FIG. 1.
Figure 3:
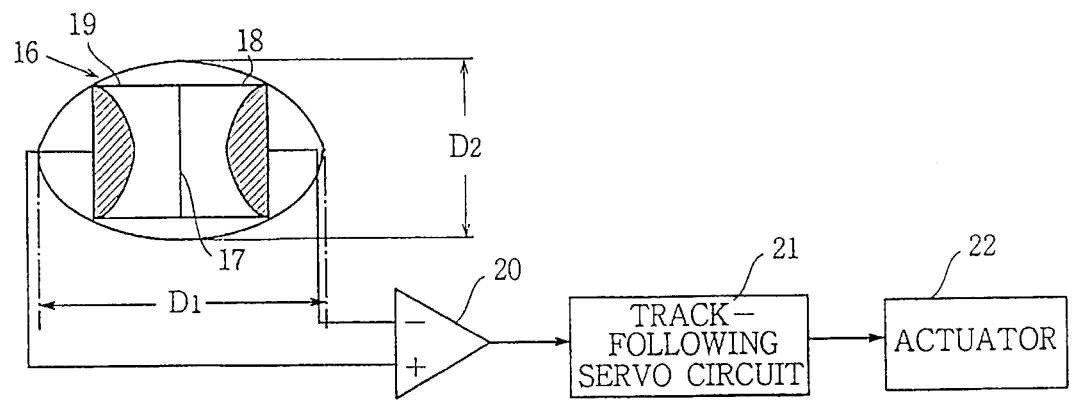
FIG. 3 is a block diagram of a track-following servo system of the pickup of FIG. 1.

Referring to FIG. 2, the reflected light beam enters the prism 11 through a front surface 11a, is refracted at a rear surface 11b, and is focused on the photodetector 16. As shown in FIG. 3, the photodetector 16 has a pair of rectangular detector elements 18 and 19 divided by a boundary line 17. Each of the detector elements 18 and 19 of the photodetector 16 produces an output representing the area of a shadow shown by a hatched area in the figure. The outputs are fed to a differential amplifier 20 which generates a tracking error signal based on the difference between the outputs. The tracking error signal is applied to a track-following servo circuit 21, thereby operating an actuator 22 to move the optical pickup so as to cause the difference to go to zero.

In operation, the laser beam reflected on the disc D and split by a beam splitter 11B enters the front surface 11a of the prism 11. The beam is refracted when passing through the rear surface 11b so that the diameter D1 of the beam is reduced to the diameter D2 in the tangential direction of the disc D as shown in FIG. 2. Namely, the beam is changed into a beam having an elliptic sectional shape, thereby forming an elliptic spot having a major axis of D1 and a minor axis of D2 as shown in FIG. 3. The length D2 of the minor axis may be changed by adjusting the angle θ1 between the front surface 11a and the rear surface 11b. The area of the spot on the photodetector 16 is determined to a sufficiently larger value than the detector elements 18 and 19 of the photodetector 16, and the major axis of the spot is perpendicular to the boundary line 17. Accordingly, even if the spot shifts in the major axis direction, the size of the shadows does not largely change. Thus, the outputs of the detector elements 18 and 19 are relatively constant, thereby preventing an error in the tracking error signal.

Figure 4:
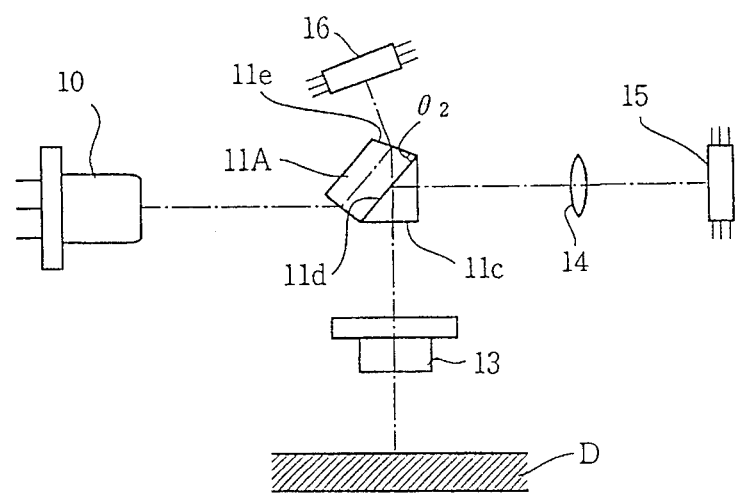
FIG. 4 is a schematic diagram showing another embodiment of an optical pickup according to the present invention.
Figure 5A:
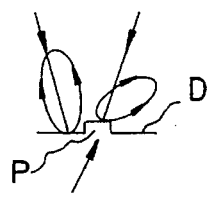
FIGS. 5a to 5c are diagrams for explaining the principle for deriving a tracking error signal in accordance with the push-pull method.
Figure 5B:
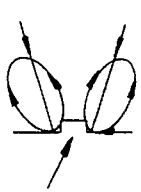
Figure 5C:
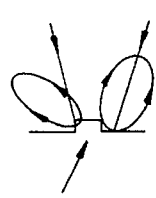
Figure 6:
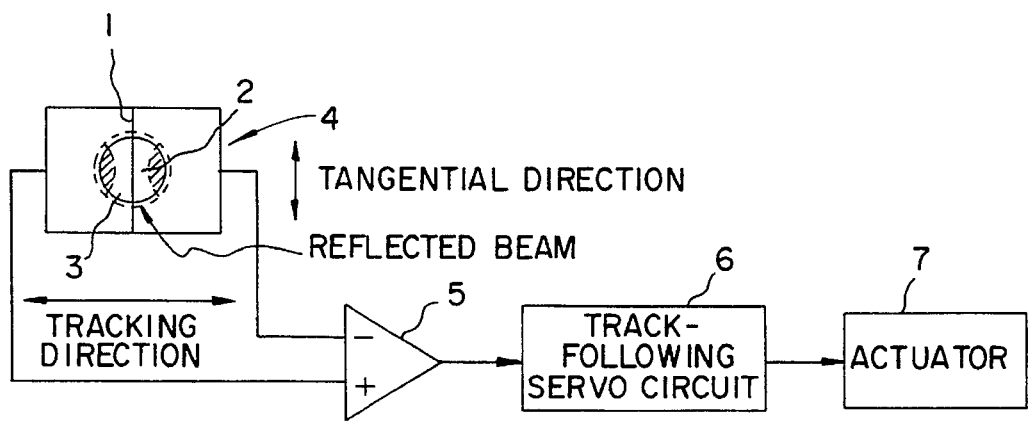
FIGS. 6 and 7 are block diagrams of a conventional track-following servo system.
Figure 7:
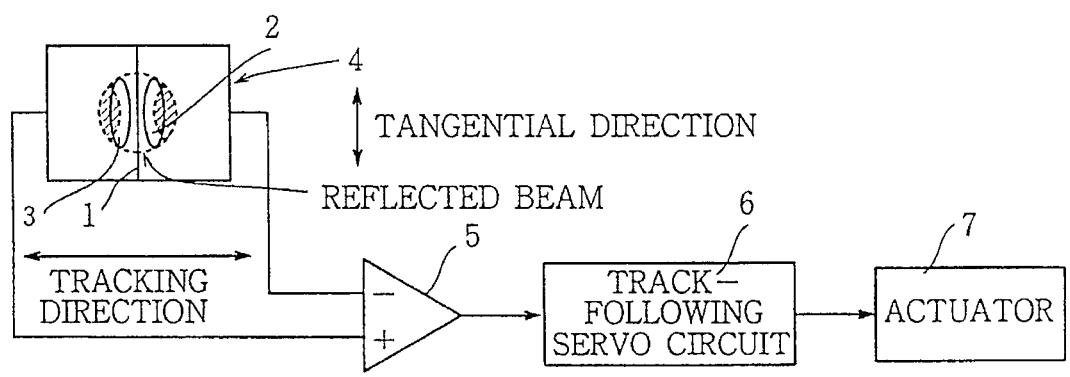

FIG. 4 shows a second embodiment of the present invention where the beam splitter 11A serves to form an elliptic beam. Namely, the laser beam reflected on the disc D enters the beam splitter 11A through a front surface 11c. The beam splitter 11A divides the beam into two, one of which is reflected on a rear surface 11d to be transmitted to the photodetector 15 for focusing through the converging lens 14. The other beam is refracted at a surface 11e and transmitted to the tracking photodetector 16. Thus, an elliptic spot having a minor axis of the length D2 is formed as in the first embodiment. The length D2 of the minor axis of the beam spot can be changed by adjusting an angle θ2 between the surface 11e and the surface 11d. The present embodiment provides the same effect as the first embodiment with a simplified construction where the beam splitter 11B and the rectifying prism 11 are omitted.

From the foregoing it will be understood that the present invention provides a track-following servo system using the push-pull method wherein the fluctuation of the area of shadows on the photodetector is restricted by deforming the beam spot into an ellipse. The masks which were used in the conventional system is no longer necessary so that the manufacturing cost is reduced.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. An optical system, used in a pushpull method, in a track-following servo system for an optical disc, comprising:

photodetectors, one of which is provided for detecting a tracking error, said one of said photodetectors having a pair of detector elements disposed side by side to receive a laser beam reflected on said optical disc; and a prism member for deforming a sectional shape of a reflected laser beam into an ellipse wherein a constant elliptic spot is formed on the one of the photodetectors, the prism member being arranged such that a direction of a major axis of the elliptic spot is the same as a disposing direction of the detector elements and corresponds to a direction perpendicular to a tangential direction of the optical disc and the major axis of said elliptic spot has a length larger than a length of the disposing direction of the detector elements whereby a DC offset caused by a deformation of said elliptic spot is prevented.

2. A system according to claim 1, wherein the prism member is disposed for refracting the reflected laser beam.

3. A system according to claim 1, wherein the elliptic spot is larger in size than the photodetector.

* * * * *